(12) United States Patent
Chyo

(10) Patent No.: US 8,371,108 B2
(45) Date of Patent: Feb. 12, 2013

(54) TWIN TURBO DIESEL AFTERTREATMENT SYSTEM

(75) Inventor: Timothy Sung Jae Chyo, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 694 days.

(21) Appl. No.: 12/535,344

(22) Filed: Aug. 4, 2009

(65) Prior Publication Data

US 2011/0023480 A1 Feb. 3, 2011

Related U.S. Application Data

(60) Provisional application No. 61/229,521, filed on Jul. 29, 2009.

(51) Int. Cl.
- *F01N 3/00* (2006.01)
- *F02B 33/44* (2006.01)
- *F02B 37/013* (2006.01)

(52) U.S. Cl. .............. 60/286; 60/612; 60/297; 60/288

(58) Field of Classification Search .......... 60/612, 60/286, 287, 288, 297, 301, 302; 422/178, 422/212; 423/231.2, 213.7, 239.1; 48/197 R
See application file for complete search history.

(56) References Cited

U.S. PATENT DOCUMENTS

| | | | |
|---|---|---|---|
| 5,199,261 A | | 4/1993 | Baker |
| 6,732,507 B1 * | | 5/2004 | Stanglmaier et al. ........... 60/286 |
| 6,820,417 B2 * | | 11/2004 | May et al. .................. 60/297 |
| 6,832,473 B2 * | | 12/2004 | Kupe et al. ................. 60/286 |
| 6,863,874 B1 * | | 3/2005 | Twigg .................... 422/178 |
| 6,865,882 B2 * | | 3/2005 | Minami ..................... 60/288 |
| 7,032,376 B1 * | | 4/2006 | Webb et al. ................ 60/297 |
| 7,062,904 B1 * | | 6/2006 | Hu et al. ................... 60/286 |
| 7,210,288 B2 * | | 5/2007 | Bandl-Konrad et al. ....... 60/286 |
| 7,334,400 B2 * | | 2/2008 | Yan et al. .................. 60/286 |
| 7,562,522 B2 * | | 7/2009 | Yan ....................... 60/286 |
| 7,814,747 B2 * | | 10/2010 | Bandl-Konrad et al. ....... 60/297 |
| 7,849,678 B2 * | | 12/2010 | Chimner et al. ............. 60/286 |
| 7,950,226 B2 * | | 5/2011 | McCarthy et al. ........... 60/286 |
| 8,069,654 B2 * | | 12/2011 | Ginter et al. ............... 60/286 |
| 2002/0174648 A1 * | | 11/2002 | Minami .................... 60/297 |
| 2006/0059910 A1 * | | 3/2006 | Spaeder et al. ............. 60/612 |
| 2007/0006573 A1 * | | 1/2007 | Hu et al. ................... 60/297 |
| 2007/0079602 A1 * | | 4/2007 | Hu et al. ................... 60/286 |
| 2008/0016849 A1 * | | 1/2008 | McCarthy et al. ........... 60/286 |
| 2008/0016851 A1 * | | 1/2008 | McCarthy et al. ........... 60/286 |
| 2008/0041053 A1 | | 2/2008 | Doring et al. |
| 2008/0178848 A1 | | 7/2008 | Duffy et al. |
| 2008/0276603 A1 | | 11/2008 | Winsor |
| 2009/0178406 A1 * | | 7/2009 | Matthews et al. ............. 60/299 |
| 2012/0216529 A1 * | | 8/2012 | Joshi et al. ................. 60/612 |

FOREIGN PATENT DOCUMENTS

| | | |
|---|---|---|
| JP | 401208519 | 8/1989 |
| JP | 409096213 | 4/1997 |
| WO | WO 2004097195 A1 * | 11/2004 |
| WO | WO 2009091835 A2 * | 7/2009 |

* cited by examiner

*Primary Examiner* — Thai Ba Trieu

(74) *Attorney, Agent, or Firm* — Julia Voutyras; Alleman Hall McCoy Russell & Tuttle LLP

(57) ABSTRACT

Exhaust temperatures in emission control devices may be directly controlled by an intake air throttle, fuel injection timing, and exhaust pressure when an emission control device is placed between two variable geometry turbocharger exhaust turbines and coupled to a combustion engine. Such an approach may substantially raise the temperature of the exhaust aftertreatment devices in an emission control device during non-warmed exhaust conditions, leading to faster catalytic light-off.

16 Claims, 3 Drawing Sheets

TWIN TURBO DIESEL AFTERTREATMENT SYSTEM

CROSS-REFERENCE TO RELATED APPLICATIONS

This application claims priority from U.S. Provisional Patent Application No. 61/229,521, entitled "Twin Turbo Diesel Aftertreatment System," filed Jul. 29, 2009, the disclosure of which is hereby incorporated by reference in its entirety and for all purposes.

FIELD

The present invention relates to a twin turbocharged diesel exhaust aftertreatment system.

BACKGROUND AND SUMMARY

Various methods are known for limiting diesel engine exhaust emissions of oxides of nitrogen (NOx), particulate matter, and hydrocarbons using diesel oxidation catalysts (DOC), particulate filters (DPF), oxides of nitrogen absorbers (LNT), and/or selective catalyst reduction (SCR) components positioned downstream of a turbocharger. However, exhaust temperatures may be lower and difficult to control when such exhaust aftertreatment devices are positioned downstream of the turbocharger. For example, such a positioning may require additional fuel to be oxidized in the DOC to activate the LNT and/or SCR and to regenerate the DPF. Further, LNT and SCR oxides of nitrogen (NOx) conversion efficiencies may be highly dependent on temperature.

The inventors herein have recognized that by placing an emission control device in between two exhaust turbines, desired exhaust temperatures may be more easily achieved. Further, exhaust temperature may be more directly controlled, such as by the intake air throttle, fuel injection timing, and exhaust pressure. The exhaust pressure may be controlled when the turbines are variable geometry turbines (VGT), include wastegate valves, variable nozzles, etc. By adjusting the VGT, wastegate valves, etc. the amount of expansion of the exhaust gas via the turbines may be controlled.

In one example, a method is provided for controlling an engine exhaust system having a first and second turbine, and with a temperature-dependent emission control device coupled between the first and second turbine. The method comprises: during a warm-up condition, operating with a decreased expansion across a first turbine positioned upstream of the emission control device and an increased expansion across a second turbine positioned downstream of the emission control device; and during at least one condition after the warm-up, operating with an increased expansion across the first turbine and a decreased expansion across the second turbine. Further, during the warm-up condition, the first turbine may be adjusted to increase expansion across the first turbine in response to a request for increased engine output, e.g., in response to a driver tip-in, when the second turbine is at a maximum level of expansion.

In such an approach the temperature of the exhaust, DPF, LNT, and/or SCR during non-warmed exhaust conditions, e.g. after engine cold starts from rest, may be substantially raised. Such a temperature increase in the emission control device may also increase NOx conversion efficiencies typically lost during a system warm up. Further, the exhaust temperature control of such an approach may eliminate the need to oxidize fuel in the DOC to control the temperature of the exhaust, DPF, LNT, and/or SCR, thus eliminating either fuel in oil dilution caused by late post fuel injection or the use of a separate fuel injector in the exhaust. As such, fuel economy may be improved. Additionally, the component size and precious metal loadings of the aftertreatment devices may be reduced due to higher temperatures in the aftertreatment devices at comparable engine speeds, loads, and warm up times.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
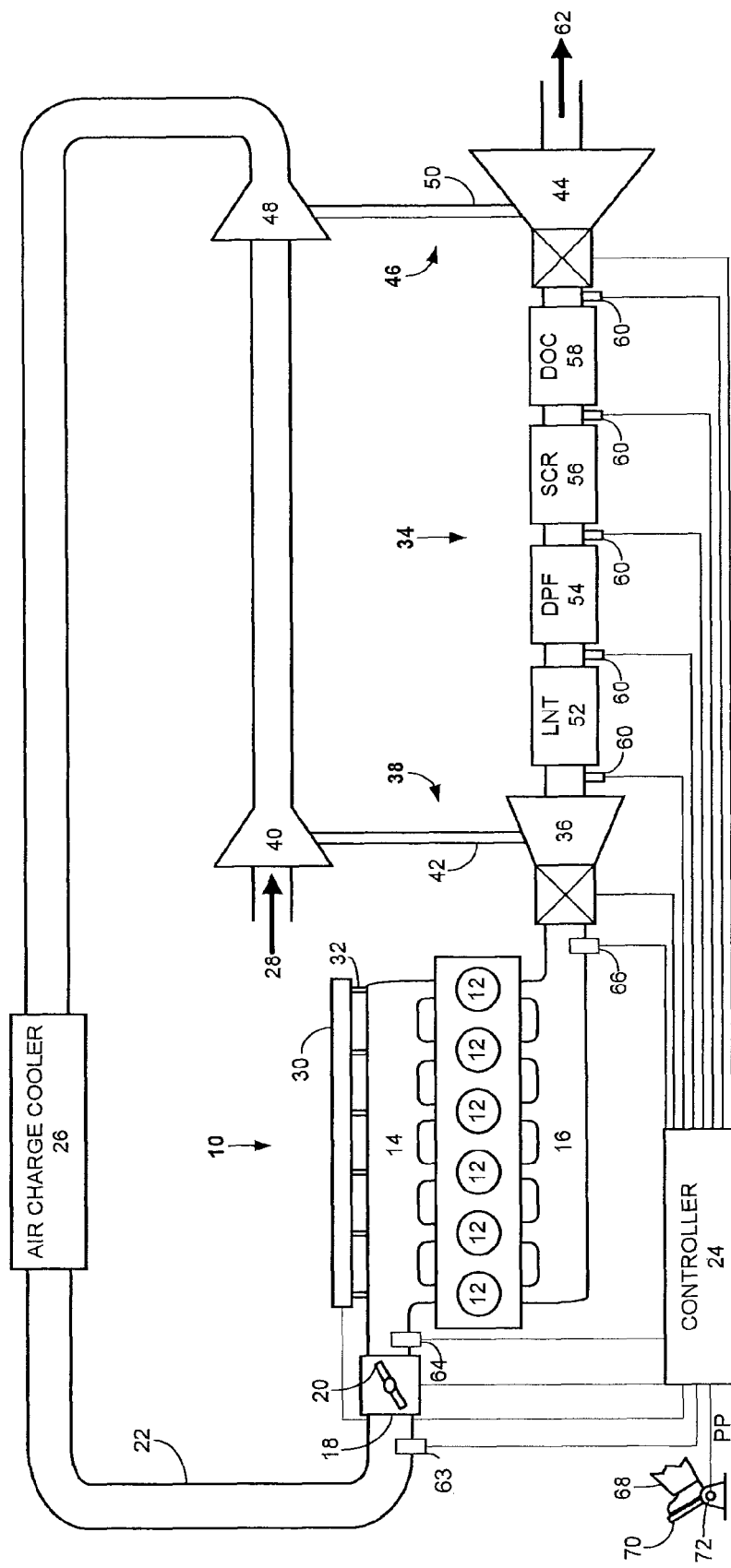
FIG. 1 shows an emission control device coupled between two turbochargers.

The following description relates to one or more emission control devices placed between two turbocharger exhaust turbines (e.g., one upstream and one downstream) and coupled to a combustion engine as shown in FIG. 1. In such a system, the exhaust temperatures may be coordinating control of various engine parameters, such as an intake air throttle, fuel injection timing, with various exhaust parameters, such as exhaust pressure. The exhaust pressure may be controlled by coordinating operation of the turbines in various operating modes, such as adjusting turbine operation via the variable geometry blade when the turbines are variable geometry turbochargers (VGT). Alternatively, in other examples, adjustment of turbine operation may include adjusting turbocharger wastegate valves, variable nozzles, etc. By adjusting the operation of the turbines among the various modes, the amount of expansion of the exhaust gas via the turbines may be controlled. Increasing the expansion across a turbine results in more energy (work) extracted from the exhaust gas (and thus more boosting), and vice versa.

Figure 2:
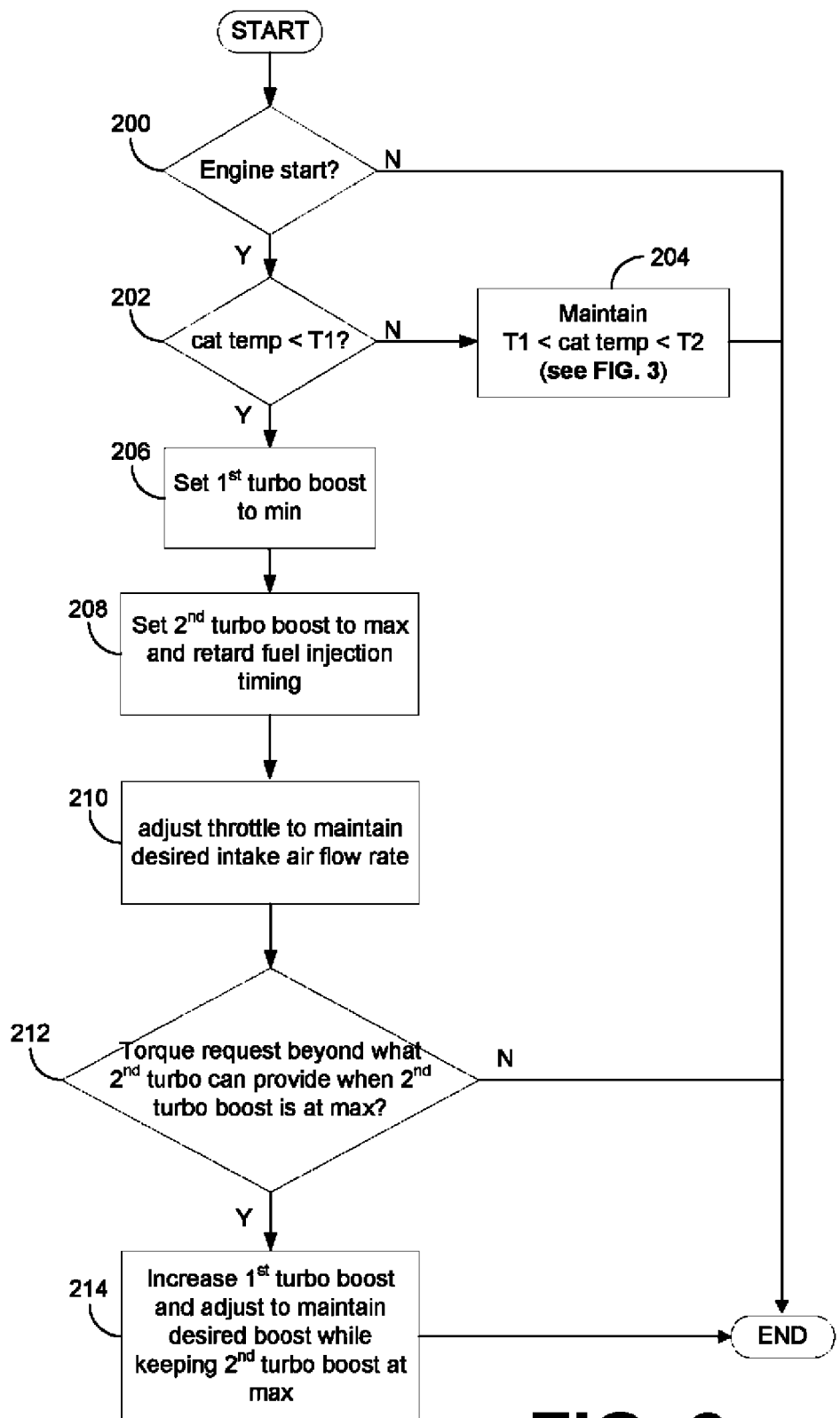
FIG. 2 shows a temperature control routine for an emission control device between two turbochargers coupled to a combustion engine during non-warmed engine operating conditions.

FIG. 2 shows an example control routine for coordinating operation of the system of FIG. 1. In a first mode, the routine operates to heat the catalysts in the emission control device during non-warmed engine operating conditions, e.g., after an engine cold start from rest. Specifically, after an engine cold start for example, the downstream turbine may be operated with increased expansion and primarily used to generate boost pressure in the engine intake, while the upstream turbine generates relatively less boost (with relatively less expansion) so that exhaust heat is maintained to raise temperature of the emission control device(s). Further, the upstream turbine may also be used to respond to requests for still further boost pressure, such as in response to increased driver demand. Alternatively, in a second mode (e.g., after warm-up operation), the upstream turbine may be operated to generate increased boost (e.g., near a maximum expansion level), while the downstream turbine operates at a lower expansion level, yet can be adjusted in response to changes in boost demand. In this way, the upstream turbine is maintained at a relatively higher boost level and thus it is possible to reduce transient delays from spooling the upstream turbine down and back up.

Figure 3:
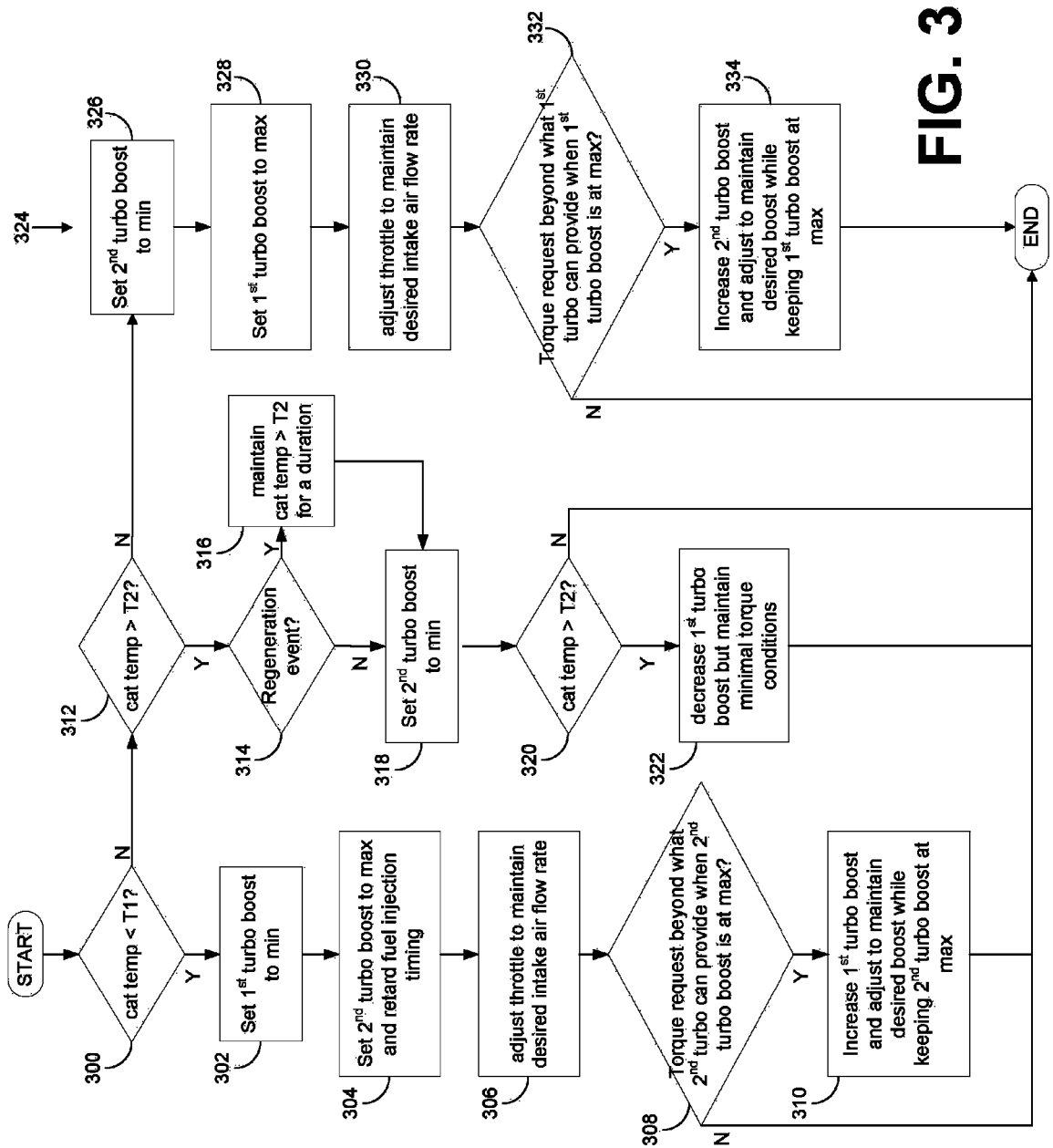
FIG. 3 shows a temperature and torque control routine for an emission control device between two turbochargers coupled to a combustion engine.

FIG. 3 shows a control routine with further details for maintaining the exhaust temperature in a temperature range during engine operation. The temperature range may be bounded below by a first temperature threshold and above by a second temperature threshold. The first threshold temperature may be a temperature at which the aftertreatment devices in the emission control device are sufficiently heated to become sufficiently catalytically active. The second temperature threshold may be a temperature at which one or more of the aftertreatment devices in the emission control device may begin to degrade if maintained at or above the temperature for sufficiently long periods of time.

Turning now to FIG. 1, an emission control device is shown coupled to a combustion engine 10. Engine 10 may include a plurality of combustion chambers (i.e. cylinders) 12. Though the example engine shown in FIG. 1 includes six cylinders, engine 10 may include any number of cylinders, for example four or eight cylinders. The combustion chambers 12 may receive intake air from intake manifold 14 and may exhaust combustion gases via exhaust passage 16. A throttle 18 may be disposed upstream of intake manifold 14 along an intake passage 22. Throttle 18 may include a throttle plate 20. The position of throttle plate 20 may be varied by a controller 24 via a signal provided to an electric motor or actuator included with throttle 18, for example. In this manner, throttle 18 may be operated to vary the intake air provided to combustion chambers 12. An air charge cooler 26 may be disposed upstream of throttle 18 along intake passage 22 to cool fresh air entering the intake passage at 28. A fuel rail 30 with a plurality of fuel injectors 32 may provide fuel to combustion chambers 12. Fuel injectors 32 may be coupled directly to combustion chambers 12 for direct fuel injection or may alternatively or additionally be arranged in the intake manifold 14 for port injection of fuel into the intake port upstream of combustion chambers 12. Fuel may be delivered to fuel rail 30 by a fuel system (not shown) including a fuel tank and a fuel pump, for example. Controller 24 may control the fuel injection timing and pulse width.

One or more emission control devices 34 may be coupled to exhaust passage 16. The turbine 36 of a first turbocharger 38 may be disposed along exhaust passage 16 upstream of emission control devices 34. Turbine 36 may be a variable geometry turbine (VGT) or may include a wastegate valve or variable nozzles, for example. The amount of expansion across the turbine of the first turbocharger 38 may be controlled by opening or closing the variable geometry turbine or the wastegate valve, for example. The variable geometry turbine or the wastegate valve may be controlled by controller 24. The compressor 40 of the first turbocharger 38 may be coupled to turbine 36 via a shaft 42 and may be located upstream of air charge cooler 26 along the intake passage 22. Increased expansion may be used to extract more heat from the exhaust and generate more power to drive the corresponding compressor, thus increasing boost. On the other hand, decreased expansion may be used to extract less heat from the exhaust and generate less boost.

The turbine 44 of a second turbocharger 46 may be disposed along the exhaust passage 16 downstream of emission control device 34. Turbine 44 may be a VGT or may include a wastegate valve, for example. The amount of expansion across the turbine of the second turbocharger 46 may also be controlled by opening or closing the variable geometry turbine or the wastegate valve, for example. The variable geometry turbine or the wastegate valve may be controlled by controller 24. The compressor 48 of the second turbocharger 46 may be coupled to turbine 44 via a shaft 50 and may be located in series and downstream of compressor 40 along the intake passage 22. In one example, the first turbine 36 of the first turbocharger 38 may be smaller than the second turbine 44 of the second turbocharger 46.

In another example, compressor 48 may be positioned upstream of compressor 40 along the intake passage 22. In still another example, compressor 40 may be coupled to turbine 44 and compressor 48 may be coupled to turbine 36.

The one or more emission control devices 34 may include a plurality of aftertreatment devices disposed therein, such as catalytic aftertreatment devices having one or more catalytic components, washcoats, etc. Further, the emission control devices may be temperature dependent. For example catalysts in emission control device may not become sufficiently catalytically active until sufficiently heated. In one example, the emission control devices may include an upstream lean NOx trap (LNT) 52 followed downstream by a diesel particulate filter (DPF) 54, a selective catalytic reducing catalyst (SCR) 56, and a diesel oxidation catalyst (DOC) 58.

It should also be understood that emission control devices 34 may include a plurality of aftertreatment device configurations not explicitly shown in FIG. 1. In one example, the emission control device may include a DOC only. In another example, the exhaust aftertreatment system may include an SCR catalyst only. In another example, the emission control device may include a DPF followed downstream by a SCR. In still another example, the emission control device may include a DOC followed downstream by a DPF then an SCR. Furthermore, the order of the different catalysts and filters in the emission control device may also vary, and still further devices may be added, such as a reductant injection system, etc. The emission control devices 34 may serve to reduce various emissions, such as NOx, CO, and HC exiting the tailpipe at 62.

The exhaust system may further include a plurality of temperature sensors 60 disposed therein. The temperature sensors may communicate with controller 24 so that engine and exhaust system operations may be adjusted based on measured temperatures of the various aftertreatment devices and exhaust in the emission control device.

Controller 24 may receive various signals from sensors coupled to engine 10 in addition to those discussed above, including measurement of inducted mass air flow (MAF) from mass air flow sensor 63; throttle position (TP) from a throttle position sensor; absolute manifold pressure signal, MAP, from sensor 64; and exhaust gas sensor 66 is shown coupled to exhaust passage 16 upstream of emission control device 34. Sensor 66 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Manifold pressure signal MAP from a manifold pressure sensor may be used to provide an indication of vacuum, or pressure, in the intake manifold. During stoichiometric operation, the MAP sensor can give an indication of engine torque. Additionally, controller 24 may communicate with input from a vehicle operator 68 via an input device 70. In this example, input device 70 includes an accelerator pedal and a pedal position sensor 72 for generating a proportional pedal position signal PP.

Turning now to FIG. 2, a routine for controlling an engine exhaust system having a first and second turbine, and with a temperature-dependent emission control device coupled between the first and second turbine, is shown. At 200, the routine determines whether the engine is started from rest. If the engine is started from rest at 200, the routine proceeds to 202. At 202 the temperature of the catalyst bricks in the emission control device is determined based on measured temperatures by one or more of a plurality of temperature sensors disposed within the emission control device. For example, the catalyst temperature may be based on temperatures measured by temperature sensors located upstream and downstream of each aftertreatment device in the emission control device. In another example, the catalyst temperature may be based on temperatures measured upstream and downstream of the emission control device. In still another example, the catalyst temperature may be modeled, for example based on the mass air flow and the amount of oxygen entering the emission control device as measured by an oxygen sensor.

At 202, the catalyst temperature is compared to a first threshold temperature T1. The first threshold temperature may be a temperature at which the aftertreatment devices in the emission control device are sufficiently heated to become sufficiently catalytically active. The conversion efficiencies of exhaust aftertreatment catalysts may be dependent on temperature. Thus, during a warm-up condition, e.g., after an engine cold start from rest, before the catalysts in the emission control device have been sufficiently heated, the exhaust emission control device may operate sub-optimally until the aftertreatment devices in the emission control device becomes sufficiently heated to achieve catalytic light-off. The first temperature threshold T1 may be based on the catalytic-light off temperatures of each of the catalysts in the emission control device, for example.

If the catalyst temperature is above the first temperature threshold T1 at 202, then the routine proceeds to 204. During at least one condition after the warm-up at 204, the engine may be operated at an increased expansion across the first turbine and a decreased expansion across the second turbine. Further, at 204 the catalyst temperature may be maintained between the first temperature threshold T1 and a second temperature threshold T2. The second temperature threshold T2 may be a temperature above which the catalysts in the emission control device may begin to degrade. The routine at 204 may include adjusting the second turbine to increase/decrease expansion across the second turbine in response to a request for increased/decreased, respectively, engine output. The routine at 204 is shown in detail in FIG. 3 and described below herein.

If the catalyst temperature is less than the first temperature threshold T1 at 202, then the catalysts in the emission control device may not yet be sufficiently heated to become sufficiently catalytically active and the routine proceeds to 206. At 206, the engine is operated with a decreased expansion across the first turbine of the first turbocharger (e.g., turbocharger 38 in FIG. 1). For example, the amount of boost provided by the first turbocharger with a first turbine disposed upstream of the emission control device along the exhaust conduit may be set to a minimum value. In one example, when the first turbine is a VGT, the VGT may be set to a fully open position. In another example, when the first turbine includes a wastegate valve, the wastegate valve may be fully open. The routine then proceeds to 208. At 208, an increased expansion is provided across the second turbine of the second turbocharger (e.g., turbocharger 46 in FIG. 1). For example, the amount of boost provided by the second turbocharger with a second turbine disposed downstream of the emission control device along exhaust passage may be set to a maximum value. At 208 the fuel injection timing may be retarded to further accelerate heating of the emission control system. Retarding fuel injection timing and increasing expansion across the second turbine at 208 may increase the temperature of the catalysts in the emission control device after an engine cold-start. At 210, the throttle (e.g., throttle 18 in FIG. 1) is adjusted to maintain the desired intake air flow supplied to the engine. For example, the throttle may be closed in proportion to the amount that the second turbocharger boost is increased at 208 in order to maintain the desired intake air flow rate.

While the second turbocharger is providing boost to the engine, if a boost or torque is requested, for example by a driver tip-in, the throttle may be opened to provide the requested torque. However, if the torque request is beyond what the second turbocharger can provide with the throttle fully open at 212, then the routine proceeds to 214. At 214, the amount of expansion across the first turbine is adjusted to meet and maintain the torque request in 212 while the amount of expansion across the second turbine is maintained at a maximum level of expansion. The routine of FIG. 2 may be continuously repeated during engine operation in order to heat the catalysts in the emission control device and provide sufficient boost to accommodate transient torque requests.

Turning now to FIG. 3, a routine is shown which maintains the catalyst temperature between a first temperature threshold T1 and a second temperature threshold T2 while accommodating transient torque requests. The routine shown in FIG. 3 includes subroutines for three different catalyst temperature conditions.

The subroutine shown generally at 300 is similar to the routine shown in FIG. 2 wherein the catalyst temperature is less than a first threshold value T1. As described above, the first temperature threshold T1 may be the temperature at which the catalysts in the emission control device are sufficiently heated to become sufficiently active. For example, the routine at 300 may be initiated at any point during warm-up conditions after an engine start. In one example, a warm-up condition may be based on when the catalyst temperature is less than the first threshold T1. In another example, a warm-up condition may be based on engine speed below a threshold, e.g., when engine RPM is less than 1200 during idle operation. In the catalyst temperature regime at 300, the second turbocharger is the primary boost source.

At 300, the catalyst temperature is compared with the first temperature threshold T1. If the catalyst temperature is less than the first threshold temperature T1, the routine proceeds to 302. At 302, the engine is operated with a decreased expansion across the first turbine. For example, the amount of boost provided by the first turbocharger with a first turbine disposed upstream of the emission control device along the exhaust conduit may be set to a minimum value. The routine then proceeds to 304. At 304, the engine is operated with an increased expansion across the second turbine. For example, the amount of boost provided by the second turbocharger with a second turbine disposed downstream of the emission control device along the exhaust passage may be set to a maximum value. Further, at 304, the fuel injection timing may be retarded to accelerate heating of the exhaust gas. At 306, the throttle is adjusted to maintain the desired intake air flow supplied to the engine. For example, the throttle may be closed in proportion to the amount that the expansion is decreased across the first at 304 in order to maintain the desired intake air flow rate.

While the second turbocharger is providing the boost, if a boost or torque is requested, for example by a driver tip-in, the throttle may be opened to provide the requested torque. However, if the torque request is beyond what the second turbocharger can provide with the throttle fully open at 308, then the routine proceeds to 310. At 310, the expansion across the first turbocharger is adjusted to meet and maintain the torque request in 308 while the second turbine is at a maximum level of expansion, e.g., VGT or wastegate valve fully closed.

If the catalyst temperature is above the first temperature threshold T1 at 300, the catalyst temperature is compared to a second temperature threshold T2. In one example, the second threshold value T2 may be a temperature T2 at which one or more of the aftertreatment devices in the emission control device may begin to degrade if maintained at or above T2 for sufficiently long periods of time. During regeneration events, when particulate soot is removed from aftertreatment filters, e.g., a DPF, the exhaust temperature may exceed the threshold temperature T2 for a duration sufficient to purge the aftertreatment filters. If the catalyst temperature is greater than the second temperature threshold T2 at 312, the emission control device may be experiencing over-temperature conditions and the routine proceeds to 314. At 314, it is determined whether the over-temperature condition is due to a regeneration event. If the answer to 314 is yes, the routine proceeds to 316 to maintain the catalyst temperature above T2 for a duration sufficient to purge the aftertreatment filters undergoing regeneration. However if the over-temperature condition is not due to a regeneration event at 314 or the regeneration event is complete at 316, the routine proceeds to 318. At 318, the expansion across the second turbine is decreased to an amount less than the amount of expansion across the second turbine during the warm-up condition. For example, the amount of boost provided by the second turbocharger (e.g., turbocharger 46 in FIG. 1) may be set to a minimum value. The routine then proceeds to 320 to again check if the catalyst temperature is greater than the second threshold temperature T2. If the answer to 320 is yes, then the routine proceeds to 322. At 322, the expansion across the first turbine is decreased. For example, the amount of boost provided by the first turbocharger (e.g., turbocharger 38 in FIG. 1) may be decreased to a minimum value where minimal engine torque conditions are maintained.

The subroutine shown generally at 324 is initiated when the catalyst temperature is between the first temperature threshold T1 and the second temperature threshold T2. During this condition at 324, the first and second turbines may be adjusted differently in response to operating conditions as compared to the warm-up condition indicated by the subroutine at 300. When the catalyst temperature is between the first temperature threshold T1 and the second temperature threshold T2 at 312, the routine of FIG. 3 proceeds to 326. At 326, the amount of expansion across the second turbine is decreased to an amount less than the amount of expansion across the second turbine during non-warmed conditions. At 326, the second turbine may be further adjusted to an amount less than the amount of expansion across the first turbine. For example, the amount of boost provided by the second turbocharger (e.g., turbocharger 46 in FIG. 1) may be set to a minimum value. The routine then proceeds to 328. At 328 the amount of expansion across the first turbine is increased to an amount greater than the amount of expansion across the first turbine during non-warmed conditions. At 328, the first turbine may be further adjusted to an amount greater than the amount of expansion across the second turbine. For example the amount of boost provided by the first turbocharger may be set to a maximum value. The throttle is then adjusted to maintain the desired intake air flow rate into the engine at 330.

As described above with regard to FIGS. 2-3, it is thus possible to coordinate different relative operation of the turbochargers in different conditions to achieve overall improved performance. For example, in order to more rapidly increase temperature of the emission control devices, increased boost can be generated from the downstream turbine, thus reducing the extraction of exhaust temperature from the devices, but while still generated boost that can be used to increase combustion (and thus exhaust) temperatures. Additionally, or alternatively, the increased back pressure generated by the downstream turbine under such situations can further aid exhaust warm-up Once the emission control device is warmed to a desired temperature, operation of the turbochargers may be adjusted, and in contrast, the upstream turbine can be used to generate increased boost (e.g., spinning at a higher speed) while reducing energy extraction of the downstream turbine. In this case, by maintaining the upstream turbine already spun-up, even when desired engine torque is temporarily reduced, for example, it is possible to rapidly increase torque via boost available from the upstream turbine, while the downstream turbine is spun-up if needed. Further, by adjusting the downstream turbine to further adjust boost while maintaining the upstream turbine boost above a threshold value, it is possible to provide desired boost levels under a variety of conditions.

Accordingly, in some embodiments, during a warm-up condition, an engine may operate with a first expansion across the first turbine and a second expansion across a second turbine. During at least one condition after the warm-up, the engine may operate with a third expansion across the first turbine and a fourth expansion across the second turbine. In some embodiments, the first expansion may be less than the second expansion and the third expansion may be greater than the fourth expansion. Further, in some embodiments, the third expansion may be greater than the first expansion and the second expansion may be greater than the fourth expansion. Additionally, the third expansion may be greater than the first expansion and the second expansion may be less than the fourth expansion. Further, the third expansion may be less than the first expansion and the second expansion may be greater than the fourth expansion.

As an example, during a warm-up condition, the first turbine may be operated to generate substantially no boost, while the downstream turbine generates 10 psi of boost. However, after warm-up, the upstream turbine may be operated to generate 5 psi of boost, while the downstream turbine generates 5 psi of boost. In each case, a total of 10 psi of boost is generated. As another example, during the warm-up condition, the first turbine may be operated to generate substantially 2 psi of boost, while the downstream turbine generates 8 psi of boost. However, after warm-up, the upstream turbine may be operated to generate 15 psi of boost, while the downstream turbine generates 8 psi of boost. Here, a different, increased, total level of boost is generated. Similarly, total boost may be decreased.

While the first turbocharger is providing the boost, if a boost or torque is requested, for example by a driver tip-in, the throttle may be opened to provide the requested torque. However, if the torque request is beyond what the first turbocharger can provide with the throttle fully open at 332, then the routine proceeds to 334. At 334, the amount of expansion across the second turbine is adjusted to meet and maintain the torque request in 332 while the amount of expansion across the first turbine is maintained at a maximum level of expansion.

The routine of FIG. 3 may be continuously repeated during engine operation in order to maintain the catalyst temperature in the emission control device in the range between the first and second temperature threshold and provide sufficient boost to accommodate transient torque requests.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for controlling an engine exhaust system having a temperature-dependent emission device coupled between a first turbine and a second turbine, comprising:
    during a warm-up condition, operating with a decreased expansion across the first turbine and an increased expansion across the second turbine; and
    during at least one condition after warm-up, operating with an increased expansion across the first turbine and a decreased expansion across the second turbine.

2. The method of claim 1 wherein the first turbine is located upstream of the emission device and the second turbine is located downstream of the emission device.

3. The method of claim 1 wherein the warm-up condition is based on engine speed below a first threshold.

4. The method of claim 1 further comprising during the warm-up condition adjusting the first turbine to increase expansion across the first turbine in response to a driver tip-in.

5. The method of claim 1 further comprising during the at least one condition after the warm-up, adjusting the second turbine to increase and/or decrease expansion across the second turbine in response to a request for increased and/or decreased, respectively, engine output.

6. The method of claim 1 further comprising during the warm-up condition, adjusting the first turbine to increase expansion across the first turbine in response to a request for increased engine output when the second turbine is at a maximum level of expansion.

7. The method of claim 1 further comprising during the at least one condition after the warm-up, adjusting the second turbine to increase expansion across the second turbine in response to a request for increased engine output when the first turbine is at a maximum level of expansion.

8. The method of claim 1 wherein the first turbine and the second turbine are adjusted differently in response to operating conditions in the at least one condition after the warm-up as compared to the warm-up.

9. The method of claim 1 further comprising during the at least one condition after the warm-up, adjusting the first turbine to increase expansion across the first turbine to an amount greater than an amount of expansion across the first turbine during the warm-up condition, and further adjusting the first turbine to an amount greater than an amount of expansion across the second turbine during the at least one condition.

10. The method of claim 1 further comprising during the at least one condition after the warm-up, adjusting the second turbine to decrease expansion across the second turbine to an amount less than an amount of expansion across the second turbine during the warm-up condition, and further adjusting the second turbine to an amount less than an amount of expansion across the first turbine during the at least one condition.

11. The method of claim 1 wherein the at least one condition after warm-up is based on a temperature threshold.

12. the method of claim 1 wherein during the warm-up condition, the method includes operating the first turbine to generate minimum boost for a first turbocharger and the second turbine to generate maximum boost for a second turbocharger.

13. A method for controlling an engine exhaust system having a temperature-dependent emission device coupled between a first turbine and a second turbine, comprising:
    during a warm-up condition, operating with a first expansion across the first turbine and a second expansion across the second turbine, the first expansion less than the second expansion; and
    during at least one condition after warm-up, operating with a third expansion across the first turbine and a fourth expansion across the second turbine, the third expansion greater than the fourth expansion.

14. The method of claim 13 wherein the third expansion is greater than the first expansion and the second expansion is greater than the fourth expansion.

15. The method of claim 13 wherein the third expansion is greater than the first expansion and the second expansion is less than the fourth expansion.

16. The method of claim 13 wherein the third expansion is less than the first expansion and the second expansion is greater than the fourth expansion.

* * * * *